United States Patent
Bauerle

(10) Patent No.: US 7,413,043 B2
(45) Date of Patent: Aug. 19, 2008

(54) METHOD AND SYSTEM FOR ESTIMATING BAROMETRIC PRESSURE IN A HYBRID VEHICLE

(75) Inventor: Paul A. Bauerle, Fenton, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 46 days.

(21) Appl. No.: 11/464,314

(22) Filed: Aug. 14, 2006

(65) Prior Publication Data

US 2008/0041645 A1   Feb. 21, 2008

(51) Int. Cl.
*B60K 1/00*   (2006.01)
(52) U.S. Cl. .................. 180/65.2; 123/406.52; 123/491
(58) Field of Classification Search ................ 180/65.2, 180/65.3, 65.8; 123/179.18, 399, 406.52, 123/406.53, 520, 431, 491; 60/289, 274; 701/112, 114
See application file for complete search history.

(56) References Cited

U.S. PATENT DOCUMENTS

| | | | |
|---|---|---|---|
| 4,538,573 A * | 9/1985 | Merrick ................. | 123/406.53 |
| 4,926,335 A | 5/1990 | Flowers et al. | |
| 5,846,157 A * | 12/1998 | Reinke et al. ................. | 477/48 |
| 6,701,247 B2 * | 3/2004 | Lee ............................. | 701/114 |
| 7,082,930 B2 * | 8/2006 | Liller et al. ............ | 123/179.16 |
| 7,128,035 B2 * | 10/2006 | Lancaster et al. ...... | 123/179.18 |
| 7,159,568 B1 * | 1/2007 | Lewis et al. ................. | 123/431 |
| 7,184,879 B1 * | 2/2007 | Lewis ....................... | 123/90.15 |
| 7,185,487 B2 * | 3/2007 | Lewis et al. ................... | 60/289 |
| 7,229,381 B2 * | 6/2007 | Niessen et al. ................. | 477/3 |
| 7,278,396 B2 * | 10/2007 | Leone et al. ................. | 123/431 |
| 7,287,492 B2 * | 10/2007 | Leone et al. ................. | 123/431 |
| 7,293,552 B2 * | 11/2007 | Leone et al. ................. | 123/520 |
| 7,296,550 B2 * | 11/2007 | Trask et al. ............ | 123/179.18 |

\* cited by examiner

*Primary Examiner*—Hau V Phan

(57) ABSTRACT

Barometric pressure is determined in a hybrid electric vehicle from manifold absolute pressure. During engine operation, wide open throttle is commanded and output torque disturbances are offset by the electric machine. Barometric pressure is estimated based on sensed intake manifold pressure and engine speed dependent pressure offsets. During engine shut down, barometric pressure may be determined from manifold pressure without any offset adjustments.

14 Claims, 2 Drawing Sheets

METHOD AND SYSTEM FOR ESTIMATING BAROMETRIC PRESSURE IN A HYBRID VEHICLE

TECHNICAL FIELD

This invention relates to a method and system for estimating barometric pressure and, more particularly, to a method and system for estimating barometric pressure in a hybrid vehicle.

BACKGROUND OF THE INVENTION

Barometric pressure varies with weather conditions and altitude. IN a motor vehicle, an accurate determination of barometric pressure is essential for various engine control functions. For instance, precise metering of the amount of air and fuel delivered to the engine is necessary to achieve the desired combustion as well as acceptable vehicle emissions. When the barometric pressure drops, typically the timing needs to be retarded and the fuel mixture richened. In addition, the barometric pressure may also be used to control idle bypass airflow, check for limp-in conditions and other diagnostic functions.

Barometric pressure can be measured in a variety of ways. Currently, in automotive applications, the barometric pressure can be measured using a barometric pressure sensor mountable on any suitable place on the vehicle where it sees true atmospheric pressure. Such a sensor generates an output signal indicative of the atmospheric pressure. The barometric pressure reading is then used for the various engine control functions. However, barometric pressure sensors can be costly and it is always desirable, particularly in automotive applications, to minimize costs.

Consequently, methods have been developed for estimating barometric pressure without the use of a separate or dedicated barometric pressure sensor. It is know, for example, that barometric pressure can be estimated when the vehicle's throttle is wide open (i.e., WOT) and, in some cases, when the vehicle's throttle is at some part throttle positions using an existing manifold absolute pressure sensor. However, there is typically a lower throttle position threshold below which barometric pressure cannot be estimated reliably. IN a hybrid vehicle, the accelerator pedal is not typically coupled to the throttle. Since the operator doesn't directly control the throttle, operation at WOT may not occur when needed or prolonged operation at or below the lower throttle position threshold is quite possible, thereby resulting in unreliable barometric pressure estimates.

Thus, it is desirable to have a reliable method for determining barometric pressure in a hybrid vehicle without the need for a barometric pressure sensor.

SUMMARY OF THE INVENTION

An engine in a hybrid electric vehicle includes a manifold absolute pressure sensor and a controller. The pressure sensor senses a pressure of the intake manifold. The controller determines if the engine is running, determines a first barometric pressure as the intake manifold pressure if the engine is not running, and determines a second barometric pressure if the engine is running.

A method for continuously estimating barometric pressure values in a hybrid vehicle having an engine, an electric machine and an intake manifold includes sensing a pressure of the intake manifold, determining if the engine is running, determining a first barometric pressure as the intake manifold pressure if the engine is not running, and determining a second barometric pressure if the engine is running.

DESCRIPTION OF THE PREFERRED EMBODIMENT

Figure 1:
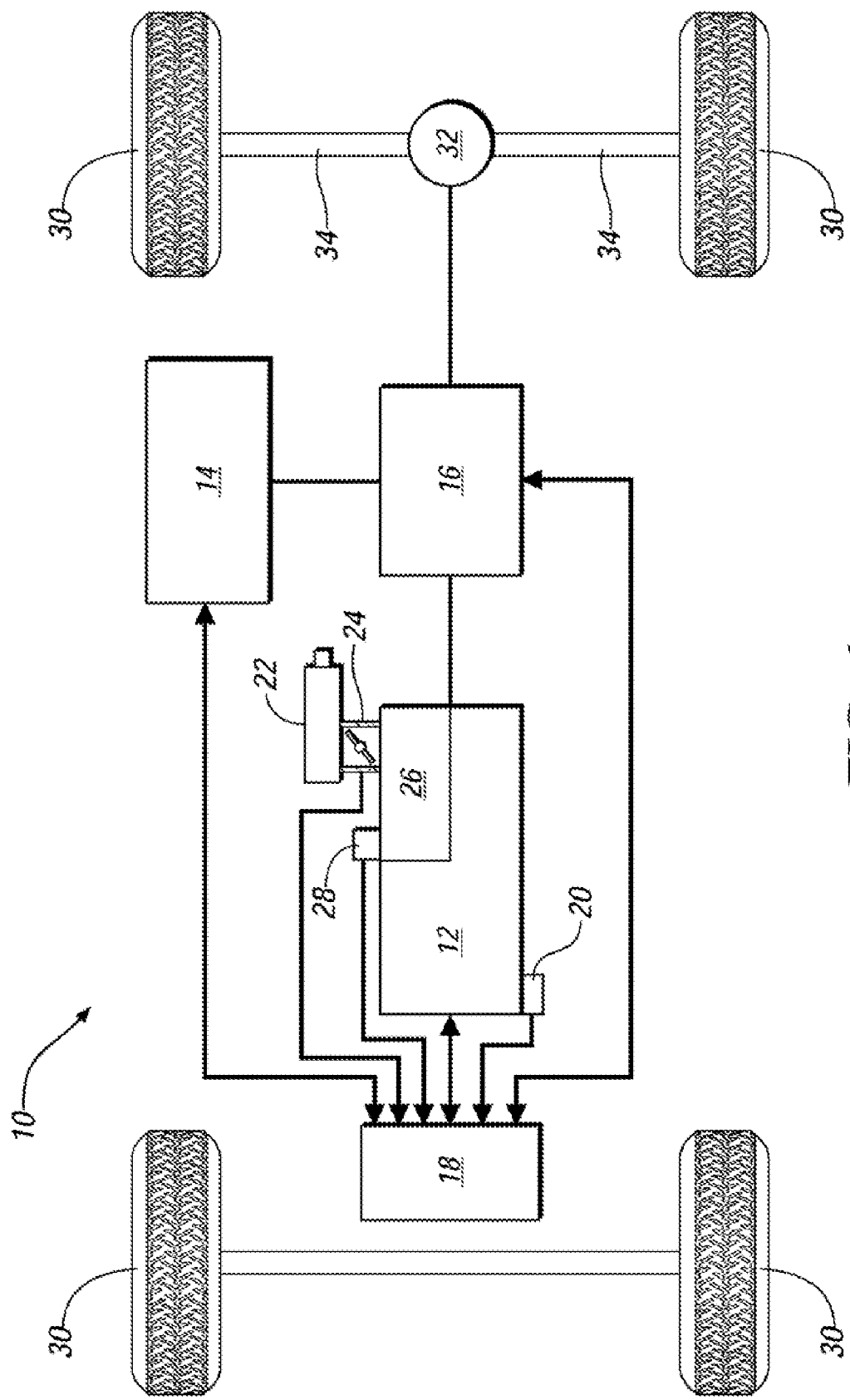
FIG. 1 is a schematic of a hybrid electric vehicle incorporating the method of the present invention.

Referring to FIG. 1, a schematic of a hybrid electric vehicle 10 is shown. The hybrid electric vehicle 10 includes an engine 12, a power source 14, an electrical machine 16, and at least one control module 18. The hybrid electric vehicle 10 may have any suitable drive train configuration, such as a series hybrid drive, a parallel hybrid drive, or a split hybrid drive as is known by those skilled in the art. The engine 12 is of the internal combustion type having a rotating crankshaft, the rotations of which are sensed by a speed sensor 20. Speed sensor 20 may be any appropriate sensor of the type adapted to generate a signal indicative of the rotational speed of the crankshaft. An example of such a sensor is a magnetic pickup adjacent to a toothed flywheel (now shown) of the engine 12 coupled to a counter that counts pulses for unit time and supplies such counts on a regular basis.

The engine 12 is also supplied with an air delivery system of the type wherein the intake air flows from the atmosphere at barometric pressure through an air filter 22 and past a throttle plate 24 which controls the regulation and flow of air into the intake manifold 26. Associated with the intake manifold 26 is a pressure sensor 28 for measuring manifold absolute pressure (MAP). MAP sensor 28 generates a signal indicative of the absolute pressure within the intake manifold 26 downstream of the throttle plate 24.

The power source 14 may be of any suitable type. For example, an electrical power source 14 such as a battery, a battery pack having a plurality of electrically interconnected cells, a capacitor, or a fuel cell may be employed. Alternatively, a non-electrical power source, such as a hydraulic power source could be employed. For simplicity, the description below will primarily refer to an embodiment of the present invention that incorporates an electrical power source.

The electrical machine 16 may be of any suitable type, such as a motor, motor-generator, or starter-alternator. In FIG. 1, the electrical machine 16 is connected to the engine 12 and the power source 14. More specifically, the electrical machine 16 may be powered by the power source 14 and may be adapted to drive the engine 12 or one or more vehicle traction wheels 30. In addition, power may flow through the electrical machine 16 in the opposite direction to charge the power source or drive the engine 12. In the embodiment shown in FIG. 1, the electrical machine 16 is connected to a differential 32 that is connected to a pair of axles 34 that are each connected to a vehicle traction wheel 30.

The control module 18 is used to monitor and control various aspects of the hybrid vehicle 10. For example, the control module 18 may be connected to the engine 12, the power source 14, and electrical machine 16 to monitor and control their operation and performance. In addition, the control module 18 also processes inputs from the various sensors for controlling the engine 12 and electrical machine 16.

With a hybrid vehicle, since there is both an engine 12 and an electrical machine 16 for driving the vehicle 10, there will be times in which the engine 12 is not turning, or running, and times when it is. When the engine 12 is not running, the intake manifold 26 will fill with atmospheric air and, thus, the barometric pressure can be estimated to equal the pressure measured by MAP 28 since there is little or not air flow. Preferably, this estimate is taken after a precalibrated amount of time has elapsed since the engine stopped running in order to allow the intake manifold 26 sufficient time to fill with the atmospheric air, for example, five (5) seconds.

In situations in which the engine 12 is running, barometric pressure needs to be estimated based on other information. The most accurate estimation of barometric pressure is possible when the throttle plate 24 is at WOT since pressure drop across the throttle valve will be minimized and predictable, control module 18 commands the throttle plate 24 to WOT when the engine 12 is in a running condition. This can be done without the driver noticing by counter-balancing the extra torque created by the engine 12 operating at WOT via the control module commanding a reciprocal decrease in current to the electrical machine 16 to result in minimal net torque difference at the powertrain output.

Prior to operating the engine 12 at WOT, however, it is preferable to check for faults, such as faults associated with the throttle plate 24 or the engine speed sensor 20. A throttle plate 24 fault would be a fault in any sensor measured throttle position, a fault with the throttle motor control such that the throttle plate 24 cannot be controlled, or a detection of too high an airflow compared to what the airflow estimated from the throttle position should be, which cold be indicative of the throttle plate 24 having fallen off, bent, having a hole therein or otherwise failed open. The MAP sensor 28 is checked to determine that it is operating in a standard range, i.e. below an upper limit and above a lower limit. Also engine speed faults may be present if the engine speed sensor 20 is missing or erratic.

If there are not faults, the barometric pressure update may be performed by controlling the engine to operate at the WOT condition. During WOT, a pressure drop between the atmosphere and the intake manifold 26, also termed an offset value, is obtained from a lookup table stored in a memory (such as a read only memory, not shown) in control module 18 that is a function of the air flow rate, or engine speed. The offset value, or pressure drop, is added to an air pressure value as measured by MAP 28. After the air pressure is measured, the throttle plate 24 is returned to the position it was in before being forced to WOT.

Barometric pressure updates, for the engine running scenario, are preferably performed periodically, either after a predetermined amount of time has elapsed or after the vehicle has traveled a predetermined distance. In the preferred embodiment, barometric pressure is updated after the vehicle has traveled a predetermined distance, since driving a vehicle on an incline could result in errors in an engine management system due to a lack of barometer update. In vehicle testing, it was discovered that driving a vehicle up or down a typical grade over 10 km resulted in errors in the engine management system. Therefore, the barometric pressure can be scheduled to be updated every 10 km when the engine is running. Thus, once the barometric pressure estimate has been performed, a distance counter, e.g., Distance Since Last Baro Pressure Update, " is reset to zero.

Figure 2:
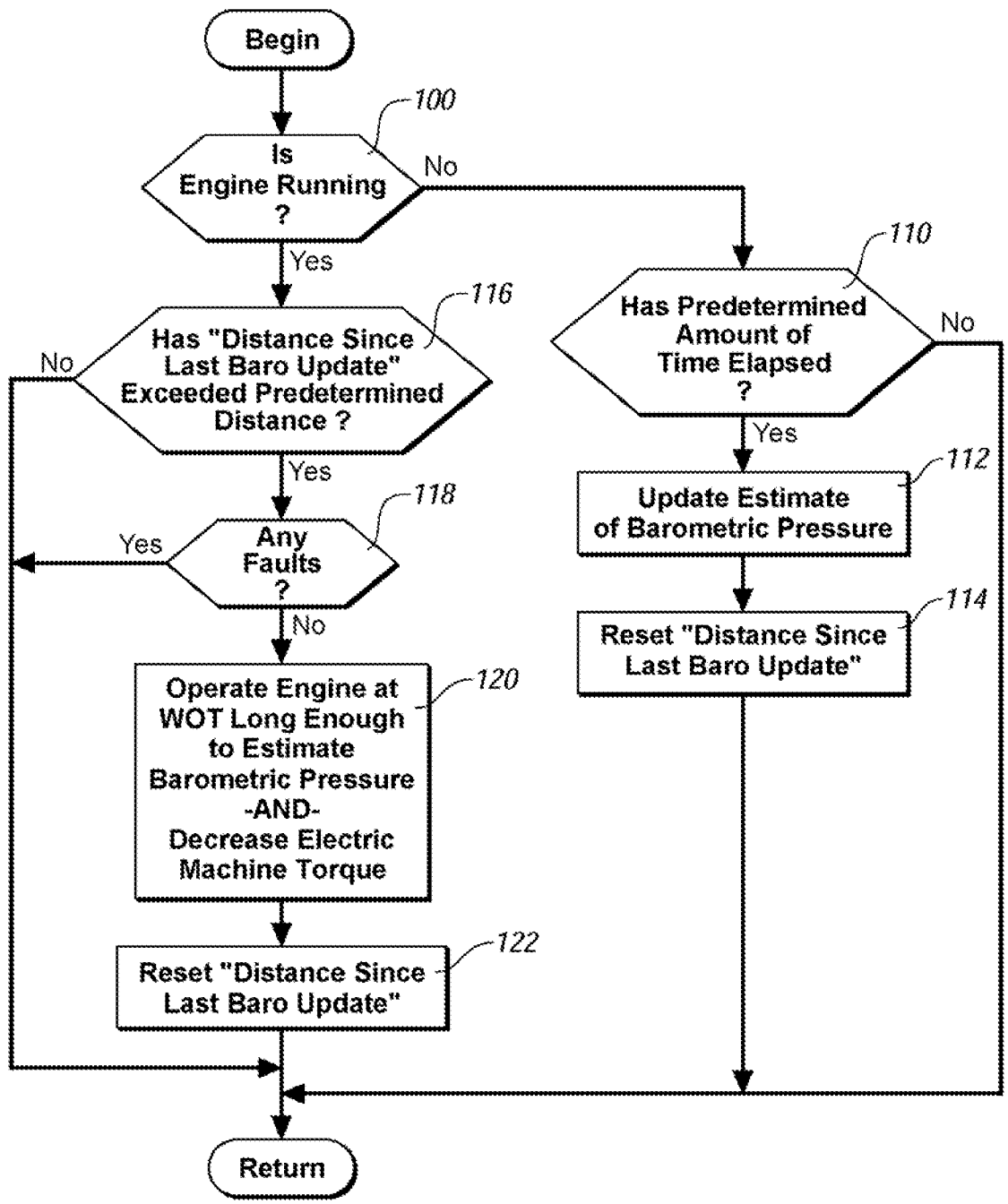
FIG. 2 is a flowchart of a method for estimating barometric pressure according to the present invention.

Turning now to FIG. 2, a flow chart outlining the steps associated with the method of the present invention will be described. As will be appreciated by one of ordinary skill in the art, the flowchart represents control logic which may be implemented using hardware, software, or combination of hardware and software. For example, the various functions may be performed using a programmed microprocessor.

The control logic may be implemented using any of a number of known programming or processing techniques or strategies and is not limited to the order or sequence illustrated. For instance, interrupt or event-driven processing is typically employed in real-time control applications, such as control of an engine or vehicle subssystem, rather than a purely sequential strategy as illustrated. Likewise, pair processing, multitasking, or multi-threaded systems and methods may be used to accomplish the objectives, features, and advantages of the present invention.

This invention is independent of the particular programming language, operating system processor, or circuitry used to develop and/or implement the control logic illustrated. Likewise, depending upon the particular programming language and processing strategy, various functions may be performed in the sequence illustrated at substantially the same time or in a different sequence while accomplishing the features and advantages of the present invention. The illustrated functions may be modified or in some cases omitted without departing from the spirit or scope of the present invention.

The method begins at 100 by determining if the engine 12 is running or not. If the engine 12 is not running, the method proceeds to step 110 where a check is made to determine if a predetermined amount of time has elapsed since the engine stopped running. If so, the barometric pressure is updated with a value equivalent to the air pressure as sensed by MAP sensor 28, step 112. If the predetermined amount of time has not elapsed, the method returns to the beginning of the sequence.

After the barometric pressure is updated, step 112, a counter is reset to zero, step 114, for use in determine the barometric pressure during the engine running condition.

Returning to step 100, if the engine is running, the method proceeds to step 116 to determine if the vehicle 10 has traveled a predetermined distance since the previous barometric pressure update was performed. If not, the method returns to the beginning of the sequence. If the vehicle has traveled the predetermined distance, a check is made to determine if there are any faults, step 118.

If there are not faults, the method proceeds to step 120 wherein the engine 12 is controlled to operate at the WOT condition long enough to estimate the barometric pressure and determine the offset value. Simultaneously, the electric machine 16 is controlled to operate at a decreased current so as to counter balance the excess torque resulting from operating the engine 12 at WOT. Depending upon the powertrain configuration, the electric machine torque (and hence the electric machine current) may actually be increased or decreased in order to counteract the increased engine torque output.

After the barometric pressure is updated at step 120, the method proceeds to step 122 where the counter is reset to zero for use in determining when the next barometric pressure update is performed when the engine 12 is running.

The description of the invention is merely exemplary in nature and, thus, variations that do not depart from the gist of the invention are intended to be within the scope of the invention. Such variations are not to be regarded as a departure from the spirit and scope of the invention.

The invention claimed is:

1. Method for estimating barometric pressure in a hybrid vehicle, the hybrid vehicle having an engine, an electric machine and an intake manifold, the method comprising:
   sensing intake manifold pressure;
   determining if the engine is running;

determining a first barometric pressure as the intake manifold pressure if the engine is not running; and determining a second barometric pressure if the engine is running, wherein determining the second barometric pressure includes controlling the engine to operate at a wide open throttle condition; sensing a speed of the engine; determining an offset based on the speed of the engine; and determining the second barometric pressure based on the offset and the intake manifold pressure.

2. The method as recited in claim 1 wherein determining the first barometric pressure includes determining if a predetermined amount of time has elapsed since the engine stopped running.

3. The method as recited in claim 1 wherein controlling the engine to operate at the wide open throttle condition further includes adjusting electric machine torque so as to counter an increase in torque from operating the engine at the wide open throttle condition.

4. The method as recited in claim 1 wherein controlling the engine to operate at the wide open throttle condition includes determining if there are any faults associated with controlling the engine at the wide open throttle condition.

5. The method as recited in claim 1 further comprising:
controlling the hybrid vehicle based on the first and second barometric pressures.

6. The method as recited in claim 1 wherein determining the second barometric pressure occurs subsequent to the hybrid vehicle having traveled a predetermined distance since determining a previous first or second barometric pressure.

7. System for estimating barometric pressure in a hybrid vehicle, the hybrid vehicle having an engine, an electric machine and an intake manifold, the system comprising:
a pressure sensor for sensing a pressure of the intake manifold;
a speed sensor for sensing a speed of the engine; and
a controller coupled to the pressure sensor and the speed sensor, the controller determining if the engine is running, determining a first barometric pressure as the intake manifold pressure if the engine is not running, and determining a second barometric pressure if the engine is running, wherein the controller in determining the second barometric pressure is operative to determine if the hybrid vehicle has traveled a predetermined distance since determining a previous first or second barometric pressure, to control the engine to operate at a wide open throttle condition, to determine an offset based on the speed of the engine, and to determine the second barometric pressure based on the offset and the intake manifold pressure.

8. The system as recited in claim 7 wherein the controller in determining the first barometric pressure is further operative to determine if a predetermined amount of time has elapsed since the engine stopped running.

9. The system as recited in claim 7 wherein the controller in controlling the engine to operate at the wide open throttle condition is further operative to adjust electric machine torque so as to counter an increase in torque from operating the engine at the wide open throttle condition.

10. The system as recited in claim 7 wherein the controller in controlling the engine to operate at the wide open throttle condition is further operative to determine if there are any faults associated with controlling the engine at the wide open throttle condition.

11. The system as recited in claim 7 wherein the controller is further operative to control the hybrid vehicle based on the first and second barometric pressures.

12. Method for estimating barometric pressure in a hybrid vehicle, the hybrid vehicle having an engine, an electric machine and an intake manifold, the method comprising:
commanding the engine to operate at wide open throttle;
adjusting electric machine torque to substantially counteract any increase in engine torque due to engine operation at wide open throttle;
sensing intake manifold pressure during engine operation at wide open throttle; and
estimating barometric pressure based on the intake manifold pressure.

13. The method as recited in claim 12 wherein estimating barometric pressure based on the intake manifold pressure further comprises:
determining a pressure offset based on engine speed; and
estimating barometric pressure based on the intake manifold pressure and the pressure offset.

14. Method for estimating barometric pressure in a hybrid vehicle, the hybrid vehicle having an engine, an electric machine and an intake manifold, the method comprising:
sensing intake manifold pressure;
determining if the engine is running;
determining a first barometric pressure as the intake manifold pressure if the engine is not running; and
determining a second barometric pressure if the engine is running, wherein the second barometric pressure is based on an offset and the intake manifold pressure.

* * * * *